(12) United States Patent
Park

(10) Patent No.: US 10,643,388 B2
(45) Date of Patent: May 5, 2020

(54) SYSTEM FOR ANALYZING DEGREE OF INTEREST IN VR IMAGE

(71) Applicant: DATAKING. INC, Anyang-si, Gyeonggi-do (KR)

(72) Inventor: Sun Kyou Park, Seoul (KR)

(73) Assignee: DATAKING. INC, Anyang-si (KR)

(*) Notice: Subject to any disclaimer, the term of this patent is extended or adjusted under 35 U.S.C. 154(b) by 0 days.

(21) Appl. No.: 16/279,428

(22) Filed: Feb. 19, 2019

(65) Prior Publication Data

US 2019/0259204 A1    Aug. 22, 2019

(30) Foreign Application Priority Data

Feb. 22, 2018  (KR) .................. 10-2018-0020948

(51) Int. Cl.
*G06T 19/00*    (2011.01)
*G06F 3/0481*   (2013.01)

(52) U.S. Cl.
CPC ........ *G06T 19/003* (2013.01); *G06F 3/04815* (2013.01)

(58) Field of Classification Search
CPC .................. G06T 19/003; G06F 3/04815
See application file for complete search history.

(56) References Cited

U.S. PATENT DOCUMENTS

2016/0027029 A1* 1/2016 Poole .............. G06Q 10/087
                                                 705/7.34
2017/0085964 A1   3/2017 Chen

FOREIGN PATENT DOCUMENTS

JP      2014-093033 A    5/2014
KR   10-2018-0020948 A   2/2018

OTHER PUBLICATIONS

Office Action issued in KR 10-2018-0020948; mailed by the Korean Intellectual Property Office dated Apr. 13, 2018.

* cited by examiner

*Primary Examiner* — Ryan R Yang
(74) *Attorney, Agent, or Firm* — Studebaker & Brackett PC

(57) ABSTRACT

The inventive concept relates to a system for analyzing a degree of interest in a VR image, which allows a user to freely move in a VR image, appreciate objects, and check information on the objects to make the user feel as if the user were actually making a visit, and analyzes a degree of interest of users by performing analysis and generating a hit map.

13 Claims, 8 Drawing Sheets

SYSTEM FOR ANALYZING DEGREE OF INTEREST IN VR IMAGE

CROSS-REFERENCE TO RELATED APPLICATIONS

A claim for priority under 35 U.S.C. § 119 is made to Korean Patent Application No. 10-2018-0020948 filed Feb. 22, 2018, in the Korean Intellectual Property Office, the entire contents of which are hereby incorporated by reference.

BACKGROUND

Embodiments of the inventive concept described herein relate to a system for analyzing a degree of interest in a Virtual Reality (VR) image.

In the past, users had to visit places such as museums, art galleries, zoos, and exhibitions. However, technologies to allow users to feel as if they were actually making a visit, through computers or VR devices have been recently developed since a VR image provides views as if the users were actually there.

In addition, there is big difference in the reaction of visitors about how the internal structures are arranged in places such as museums, art galleries, exhibitions, and how objects are arranged. In this case, it is practically difficult to collect the reaction of the visitors and apply it to internal arrangement.

An apparatus actually placed in a place, such as a museum, an art gallery, or an exhibition to analyze the traffic lines and eyes of visitors and control an exhibition space is disclosed in Korean Patent No. 10-1672268 (Oct. 26, 2016). However, a patent for analyzing a degree of interest of the user who watches the VR image is not disclosed.

SUMMARY

Embodiments of the inventive concept provide a system for analyzing a degree of interest in a Virtual Reality (VR) image, which tracks a traffic line along which a user moves in the VR image and an object which the user appreciates and generates a hit map in the VR image.

However, problems to be solved by the inventive concept may not be limited to the above-described problems. Although not described herein, other problems to be solved by the inventive concept can be clearly understood by those skilled in the art from the following description.

According to an exemplary embodiment, a system for analyzing a degree of interest of a user who watches a Virtual Reality (VR) image transmitted to a user terminal or a VR device from a server, the system includes by using selection history of a first point, and a hit map generating device configured to analyze traffic lines of all user who have watched the VR image through information collected by the collecting device and generate a hit map in the VR image according to frequencies with which the users have visited each position in the VR image, wherein the first point is displayed on a travel route in the VR image and allows the user to be moved to a corresponding position in the VR image when being selected by the user.

The collecting device may count numbers of visits to first points selected by the user by using selection history of the first points, and the hit map generating device may generate a hit map in the VR image by summing the numbers of visits to the first points selected by all users who have watched the VR image.

When the user moves back to a previous position by selecting a first point, the collecting device may further count a number of visits to the corresponding first point.

The collecting device may count a number of visits to each object in the VR image by using selection history of second points. The hit map generating device may generate a hit map in the VR image by summing numbers of visits to objects by all users who have watched the VR image. In addition, the second points may be respectively displayed along with the objects in the VR image, when a mouse is passed over the second point by the user, may allow information on a corresponding object to be displayed, and when the second point is selected by the user, allow the user to be moved to a first point adjacent to the corresponding object in the VR image.

The collecting device may count the number of visits to each object in the VR image using the selection history of the second point, and the hit map generating device may generate the hit map in the VR image by summing the numbers of visits to the objects of all users who have watched the VR image.

The collecting device may output a list of objects in the VR image to a user who has watched the VR image and receive a selection of an object which the user wants to again watch, from the user, and the system may further include an analyzing device configured to set, as an object of interest, an object which has selected by the user for re-watching a predetermined number of times or more.

The system may further include an analyzing device configured to divide an area in the VR image into two or more zones and count a total number of visits to each of the zones and a total number of visits to each object in each of the zones and select an object which is most visited, among objects of each of the zones.

The system may further include an analyzing device configured to allocate two or more neighboring objects in the VR image to a group, and set an object which is most visited as an object of interest, among objects of each group.

The system may further include an input device configured to receive a gender and an age group of the user, and the hit map generating device may generate a hit map associated with traffic lines and numbers of visits to objects in the VR image for each gender and for each age group.

The main visitors may be set to VR image with a specific gender and a specific age group according to purpose of each VR image, and the hit map generating device may generate, as a main visitor-hit map, a hit map associated with traffic lines and numbers of visits to objects of users with the specific gender and the specific age group, corresponding to the main visitors, from among all users who have watched the VR image.

The hit map generating device may indicate, as a saturation zone, a zone in which a number of times that traffic lines of different users cross each other exceeds a threshold value.

The collecting device may detect login of a user who watches the VR image, and the hit map generating device may separately generate a hit map for users who watch each VR image for the first time and a hit map for users who again watch each VR image.

According to an exemplary embodiment, an autonomous play button configured to allow the user to appreciate objects in the VR image while moving from an entrance to an exit at a predetermined speed and along a predetermined route by passing through first points, a collecting device configured to count a number of visits to a first point corresponding to a position at which a pause button is selected by the user during autonomous play of the VR image and count a number of visits to an object corresponding to a second point selected by the user during pause; and a hit map generating device configured to generate a hit map in the VR image according to the number of visits to each position and the number of visits to each object in the VR image through information collected by the collecting device, wherein the first points are indicated as a travel route in the VR image and when a mouse is passed over by the user, allows information on a corresponding object to be displayed, and when being selected, allows the user to be moved to a first point adjacent to a corresponding object in the VR image.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
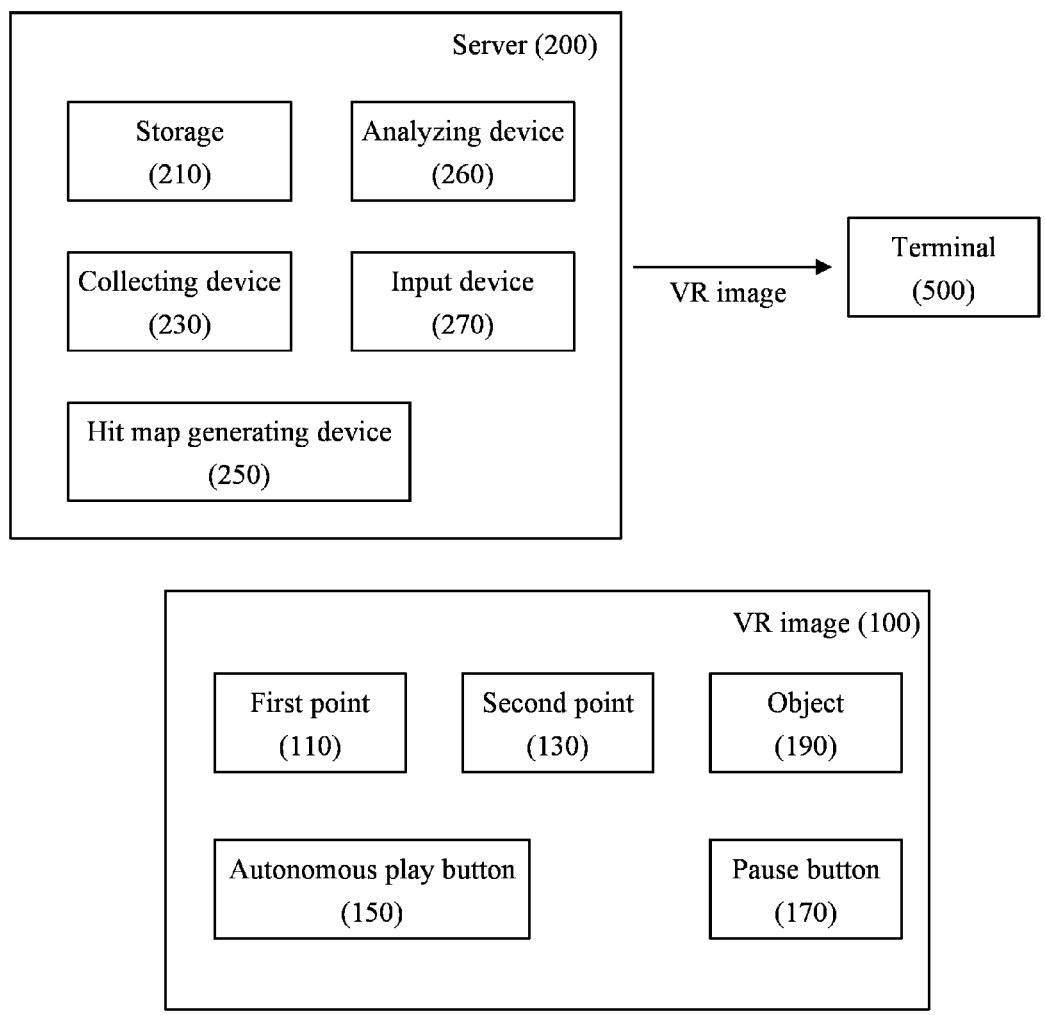
FIG. 1 is a block diagram of a system for analyzing a degree of interest in VR images according to an embodiment of the inventive concept.

Advantages and features of the inventive concept and methods to achieve them will become apparent from the descriptions of embodiments herein below with reference to the accompanying drawings. However, the inventive concept is not limited to embodiments disclosed herein but may be implemented in various different forms. The embodiments are provided for making the concept of the inventive concept thorough and for fully conveying the scope of the inventive concept to those skilled in the art. It is to be noted that the scope of the inventive concept is defined only by the claims.

The terminology used herein is for the purpose of describing embodiments only and is not intended to be limiting of the inventive concept. As used herein, the singular forms are intended to include the plural forms as well, unless the context clearly indicates otherwise. As used herein, the word "comprises" and/or "comprising" does not exclude the presence or addition of other elements than those listed herein. Like numerals refer to like elements throughout. As used herein, the term "and/or" includes any and all combinations of one or more of the associated listed items. Although the terms "first", "second", etc. may be used herein to describe various elements, these elements should not be limited by these terms. These terms are only used to distinguish one element from another element. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this inventive concept belongs. It will be further understood that terms such as those defined in commonly used dictionaries, will not be interpreted in an idealized or overly formal sense unless expressly so defined herein.

Hereinafter, embodiments of the inventive concept will be described in detail with reference to the accompanying drawings.

Prior to explanation, the meaning of terms used in this specification will be briefly described. It should be noted, however, that the description of the terms is intended to assist the understanding of the present specification, and thus is not used to limit the technical spirit of the inventive concept unless explicitly described as limiting the inventive concept.

A Virtual Reality (VR) image: is an image implementing a single three-dimensional (3D) space as reality by combining 360° multi-perspective images. A user may move within the image according to the user's intention and watch a specific object 190 by zooming in or zooming out the object 190.

A terminal 500 refers to a device for allowing a user to use a VR image 100 provided by a server 200 of the inventive concept in real time or through downloading, and any means may be applicable as long as it can play an image, such as a VR device, a computer, a notebook, or a smart-phone.

In addition, in describing embodiments of the inventive concept, moving the user means moving the location and time point of the user in the VR image 100, rather than moving the physical location of the user.

FIG. 1 is a block diagram of a system 10 for analyzing a degree of interest in the VR image 100 according to an embodiment of the inventive concept.

Referring to FIG. 1, the system 10 for analyzing a degree of interest in the VR image 100 according to an embodiment of the inventive concept may include the server 200, the VR image 100, and the terminal 500. The server 200 may include storage 210, a collecting device 230, a hit map generating device 250, and an analyzing device 260.

The storage 210 may store the VR image 100, and preferably store VR images 100 of places, such as a museum, an art gallery, an exhibition, or a library.

Therefore, a user may access the server 200 through the terminal 500 without actually visiting a specific place where the object 190 is displayed, such as a museum, an art gallery, an exhibition, or a library, and appreciate the object 190 through the VR image 100 as if the user has actually watched the object 190. In this way, the inventive concept may analyze the degree of interest of the users (visitors) in the VR image 100.

In this case, the VR image 100 may include a first point 110, a second point 130, the object 190, an autonomous play button 150, and a pause button 170.

The first point 110 may be displayed on a travel route in the VR image 100. When being selected by a user, the first point 110 may allow the user to be moved to a corresponding position in the VR image 100.

Therefore, the first point 110 may be displayed at uniform intervals on the travel route in the VR image 100 and may be a component for allowing the user to be moved to the corresponding position in the VR image 100 when is being selected or clicked.

The object 190 may refer to a subject to be appreciated in the VR images 100, and may mean an exhibit arranged in a museum, a painting arranged in an art gallery, or the like.

In addition, the second point 130 is displayed along with each object 190 in the VR images 100, and when a mouse is passed over by a user, information on a corresponding object 190 is displayed. When being selected by the user, the second point 130 may allow the user to be moved to the first point 110 adjacent to the corresponding object 190 in the VR image 100.

Preferably, when a mouse is passed over a specific second point 130 by the user, photography and information related with an object 190 corresponding to the specific second point 130 are displayed. When being selected by the user, the second point 130 may be a component for allowing the user to be moved to a corresponding position in the VR images 100. In this case, it is preferable to move the user to a position of the first point 110 adjacent to the corresponding object 190.

More specifically, coordinates (X, Y, Z) information in the VR image 100 of each first point 110 is stored. When a specific first point 110 is selected by a user, the user is allowed to be moved to the coordinates (X, Y, Z) of the specific first point 110 in the VR image 100, thereby allowing the user to rotate a screen with 360 degrees at a corresponding position to perform appreciation.

The collecting device 230 may collect a traffic line of a user in the VR image 100 by using the selection history of first points 110.

More specifically, since the coordinates (X, Y, Z) information of the first points 110 in the VR image 100 are stored, the collecting device 230 may detect a traffic line and a travel route through which the user moves, by using the first points 110.

The hit map generating device 250 may analyze traffic lines of all users who have watched the VR image 100, through information collected by the collecting device 230 and generate a hit map in the VR image 100 according to frequencies with which the users have visited each position in the VR image 100.

Preferably, the collecting device 230 may count numbers of times that users visit each position in the VR image 100 using the selection history of the first points 110, and the hit map generating device 250 may generate the hit map in the VR image 100 by summing the numbers of times that the users, who have watched the VR image 100, visit each position in the VR image 100 through the information collected by the collecting device 230.

In addition, the collecting device 230 may count the number of times that the users visit each object 190 in the VR image 100 using the selection history of the second points 130, and the hit map generating device 250 may generate the hit map in the VR image 100 by summing the numbers of times that the users, who have watched the VR image 100, visit each object 190 in the VR image 100.

More specifically, since the coordinates (X, Y, Z) information of the second point 130 in the VR image 100 is stored, like the first point 110, the collecting device 230 may detect positions of the objects 190 which the user has appreciated using the second points 130.

Therefore, according to the configurations of the collecting device 230 and the hit map generating device 250, it is possible to establish data and numerical values with respect to along which route the users, who have watched the VR image 100, move the most and what kind of objects 190 the users are interested in, thereby analyzing the degree of interest of the users.

In addition, when the user moves back to a previous position by selecting the first point 110, the collecting device 230 may further count the number of visits to the first point 110.

For example, in a case in which, when the user is appreciating the objects 190 while moving within the VR image 100 by using the first points 110, the user moves back to the previous position by selecting a specific first point 110 to again appreciate the object 190 which the user had appreciated, the collecting device 230 may determine that the user moved to further appreciate the object 190 and further count the number of visits to the first point 110.

Similarly, when the user again moves back to a previous position by selecting the second point 130, the collecting device 230 may further count the number of visits to the first point 110 corresponding to the corresponding position.

In addition, when the user checks information on the object 190 by passing a mouse over a specific second point 130, the collecting device 230 may count the number of visits to the corresponding object 190.

As another example, the collecting device 230 may output a list of the objects 190 in the VR image 100 to the user who had watched the VR image 100 and receive a selection of a certain object 190 which the user wants to again watch, from the user. The analyzing device 260 may set the object 190 selected no less than a predetermined number of times by all users as an object 190 of interest.

It may be possible to set the object 190, well-received through a survey by users who had watched the VR image 100, as an object 190 of interest and thus, analyze the degree of interest of the users.

As still another example, an area in the VR image 100 may be divided into two or more zones.

The analyzing device 260 may count a total number of visits to each of the zones into which the area is divided and the number of visits to each object 190 in each of the zones and select an object 190 which is most visited, among objects 190 of each of the zones.

For example, an exhibition space such as a museum or an art gallery is divided into zones by theme, and objects 190 corresponding to each theme are displayed. Therefore, the analyzing device 260 may divide a space in the VR image 100 in the same manner as described above, select which of objects 190 is an object 190 which is most visited in each of the zones, and select which of displayed objects 190 is an object 190 in which the users are interested in each of the zones.

As another example, the analyzing device 260 may allocate two or more objects 190 in the VR image 100 to a group, and set, as an object 190 of interest, an object 190 which is most visited, among objects 190 of each group.

Similarly, it is possible to select which of several objects 190 is an object 190 which the users are interested in.

An input device 270 may receive a gender and an age group from a user who accesses the server 200 and watches the VR image 100.

The hit map generating device 250 may generate a hit map associated with traffic lines and numbers of visits to objects 190 in the VR image for each gender and each group age.

In the case of selecting an age group and a gender, it may be possible to check a hit map associated with traffic lines of users and numbers of times the users visit an object 190 with respect to users belonging to the selected gender or age group, thereby enabling analysis with respect to along which of traffic lines users move and which of objects users are interested in for each gender and each age group.

As still another embodiment of the inventive concept, when receiving the user's gender, age, education level, major and occupational category, the collecting device 230 may collect information on the traffic line and the number of visits to objects 190 of the user according to the user's gender, age, education level, major and occupational category received from the user, and the hit map generating device 250 may generate a hit map associated with the traffic line and the number of visits to the objects 190 according to respective information.

In addition, the main visitor is set for the VR image 100 is set to with a certain gender and a certain age group according to the purpose of each VR image 100. The hit map generating device 250 may generate, as a main visitor-hit map, a hit map associated with the traffic lines and number of visits to the objects 190 of users with the certain gender and the certain age group, corresponding to main visitors, from among all users who have watched the VR image 100.

Main visitors may vary depending on the purpose of museums, art galleries, and exhibitions. For example, there is a museum which women in their 20s or 30s mainly visit, or an exhibition targeting children.

Accordingly, in such a special case, since the hit map associated with the traffic lines and the number of visits to the object 190 of all users may be relatively ineffective, main visitors are set according to the purpose of the VR image 100, and the degree of interest of the main visitors may be analyzed by analyzing the traffic lines and the number of visits to the object 190 of the main visitors.

In addition, the hit map generating device 250 may analyze the traffic lines of all users who have watched the VR image 100 through information collected by the collecting device 230, and indicate, as a saturation zone, a zone in which the number of times that the traffic lines of different users cross each other exceeds a threshold value.

Although a one-man service in which each individual accesses a system and watches images is provided in the VR image 100, congestion may be actually caused when traffic lines of many visitors cross each other in places such as museums and art galleries.

Therefore, the traffic lines of users in the VR image 100 may be analyzed and a position in which the number of times that the traffic lines of different users cross each other is large is indicated as a saturation zone. In the case of planning traffic lines in an actual place, the corresponding position may be referred to as a zone in which congestion may be caused due to many visitors.

In this case, crossing of traffic lines may mean a case in which traffic lines heading in different travel directions cross each other (a position in which a point at which a traffic line crosses another traffic line is generated), except traffic lines exiting on the same travel route.

As another example, the collecting device 230 may detect the login of a user who watches the VR image 100 and the hit map generating device 250 may separately generate a hit map for users who watch the VR image 100 for the first time and a hit map for users who again watch the VR image 100.

In this way, it is possible to figure out the traffic lines of visitors who visit a place for the first time and visitors who again visit the place, and how the trend of appreciation for the object 190 is changed.

The system 10 for analyzing a degree of interest in the VR image 100 according to another embodiment of the inventive concept may further include the autonomous play button 150 and the pause button 170.

The autonomous play button 150 may allow a user to appreciate the objects 190 in the VR image 100 while moving from an entrance to an exit at a predetermined speed and along a predetermined route by passing through the first points 110.

When the pause button 170 is selected by the user, the pause button 170 may temporarily stop and pause the autonomous play at the first point 110 of a corresponding position.

When the user discovers the object 190 which the user wants to stop movement and appreciate during watching of the VR image 100 through autonomous play, the user may stop the autonomous play mode and watch surrounding objects 190 in detail.

Accordingly, the collecting device 230 may count the number of visits to the first point 110 corresponding to a position at which the pause button 170 is selected by the user during the autonomous play of the VR image 100, and count the number of visits to the object 190 corresponding to the second point 130 selected by the user during pause.

The hit map generating device 250 may generate a hit map in the VR image 100 according to a position of each object 190 in the VR image and the number of visits to each object 190 through information collected by the collecting device 230.

In this way, it is possible to collect information on the dynamic degree of interest of users who watch the VR image through a manual play mode, and collect information on the dynamic degree of interest of users who watch the VR image through the autonomous play mode.

Figure 2:
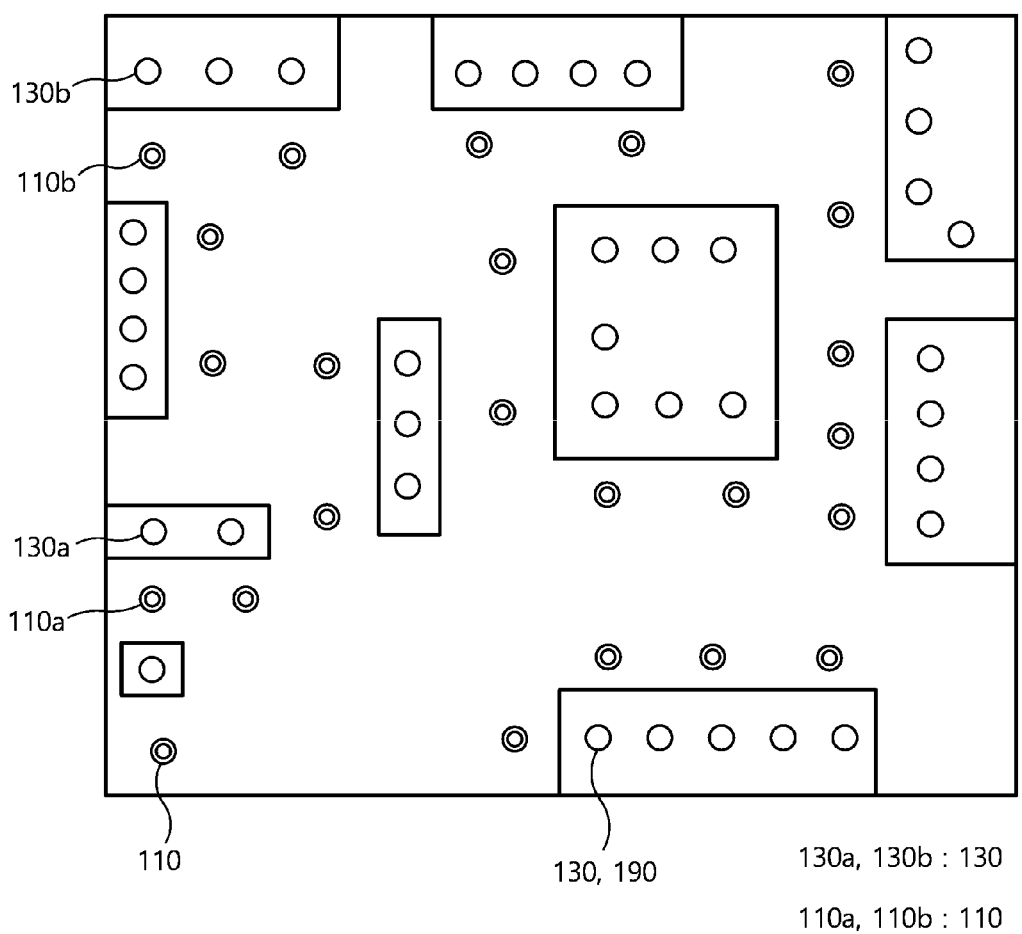
FIG. 2 is an exemplary diagram two-dimensionally illustrating a VR image according to an embodiment of the inventive concept.

FIG. 2 is an exemplary diagram two-dimensionally illustrating a VR image 100 according to an embodiment of the inventive concept.

Referring to FIG. 2, a plurality of first points 110 may be displayed on a travel route in the VR image 100 such that a user moves to each position in the VR image 100, and may allow the user to be moved to corresponding positions when being selected.

A plurality of second points 130 may be displayed along with objects 190 in the VR image 100. The second points 130 may be displayed which allow information on a corresponding object 190 to be displayed when being selected by the user, and allow the user to be moved to the position of the first point 110 adjacent to the corresponding object 190.

Therefore, when selecting or clicking a first point 110a, the user may move to a corresponding position. When passing a mouse over a second point 130a, the user may check information on a corresponding object 190. When selecting or clicking the second point 130a, the user may move to the first point 110a adjacent to the corresponding object 190.

In addition, when selecting or clicking a first point 110b, the user may move to a corresponding position. When passing a mouse over a second point 130b, the user may check information on a corresponding object 190. When selecting or clicking the second point 130b, the user may move to the first point 110b adjacent to the corresponding object 190.

Figure 3:
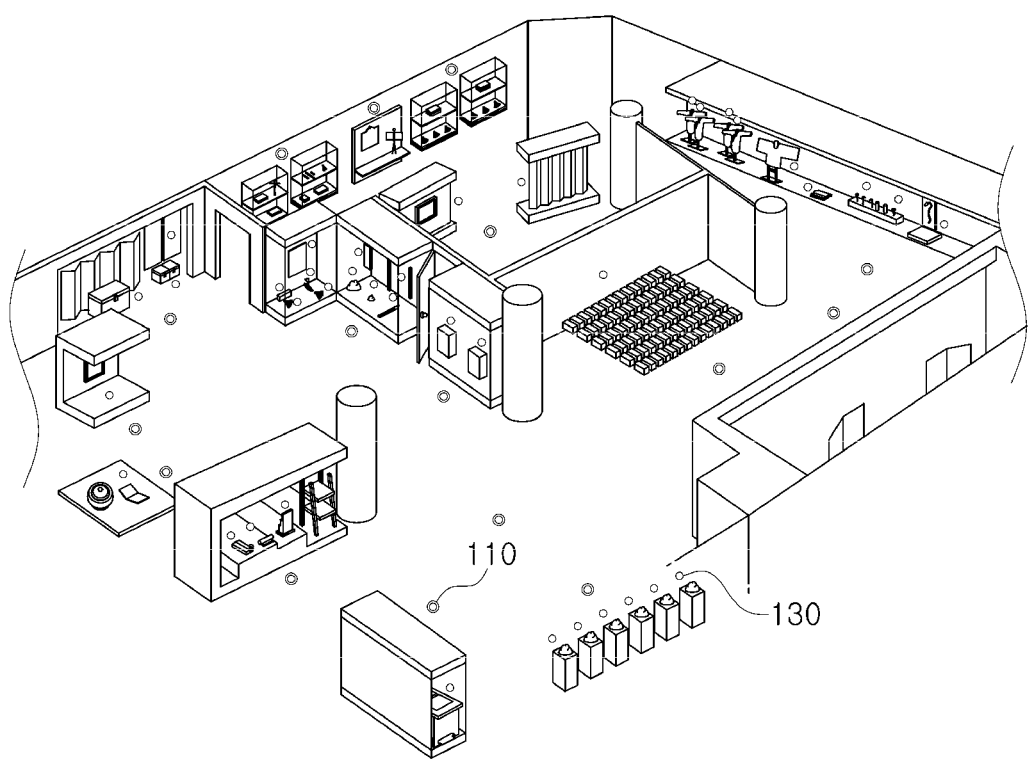
FIG. 3 is an exemplary diagram illustrating a VR image implementing FIG. 2 in practice.
Figure 4:
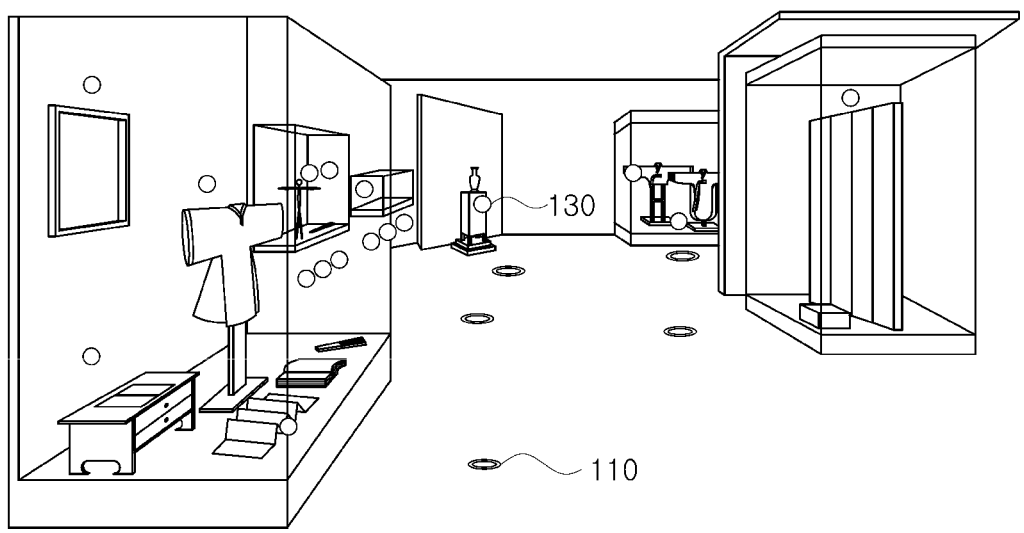
FIG. 4 is an exemplary diagram illustrating a case in which a user moves to a corresponding point by selecting a specific first point in FIG. 3.

FIG. 3 is an exemplary diagram illustrating a VR image 100 implementing FIG. 2 in practice, and FIG. 4 is an exemplary diagram illustrating a case in which a user moves to a corresponding point by selecting a specific first point of FIG. 3.

FIG. 3 illustrates the VR image 100 implementing FIG. 2 in practice and a screen viewed from an upper floor in a museum is illustrated in FIG. 3.

Referring to FIG. 3, second points 130 are displayed along with respective objects 190 and, when a mouse is passed over a travel route, first points 110 are displayed on a screen at predetermined intervals on the travel route. Clicking a specific first point 110 may allow the user to be moved to a corresponding position.

Referring to FIG. 4, there is illustrated a case in which a user moves to a corresponding position by clicking the specific first point 110 in FIG. 3.

The user may watch a screen in 360 degrees by moving the screen at the corresponding position and may zoom in or zoom out the screen.

In a case in which the user wants to further know information on a specific object 190, when the user passes a mouse over or selects a second point 130 displayed along with the object 190, the information on the object 190 is displayed.

When selecting a first point 110 positioned in a place to which the user wants to move, the user may move to a corresponding position.

Figure 5:
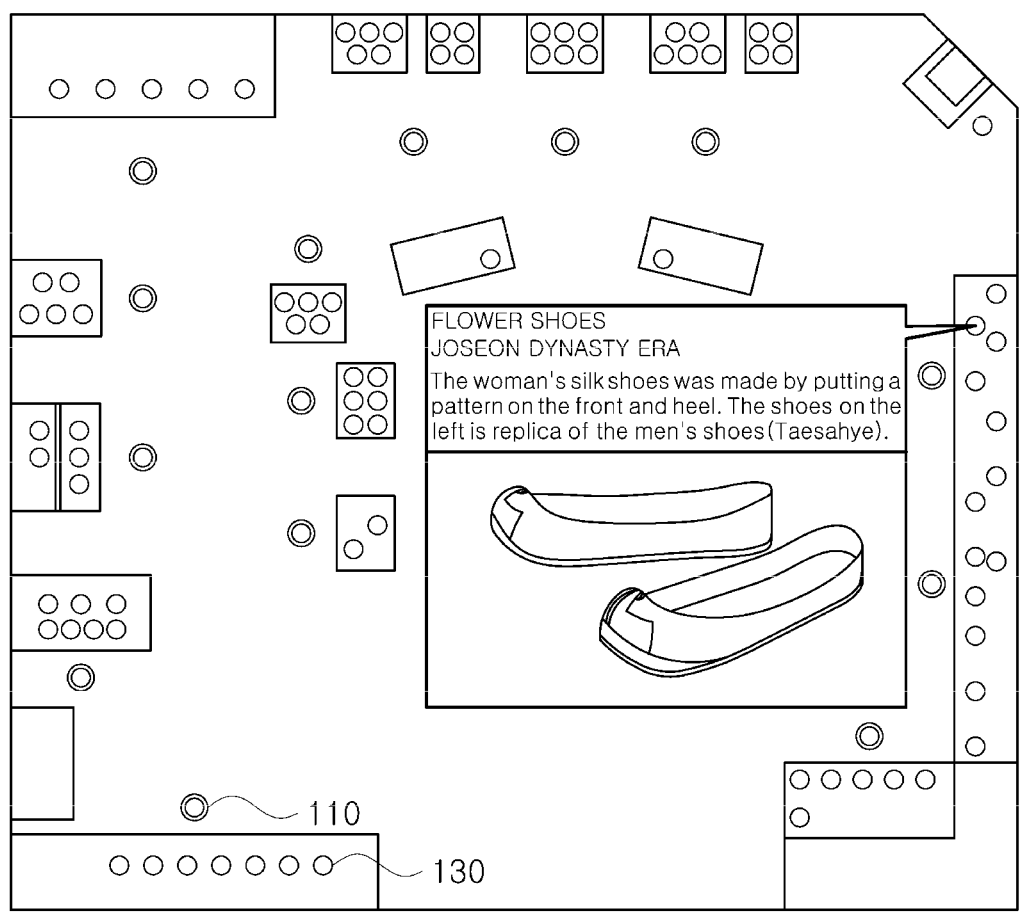
FIG. 5 is an exemplary diagram illustrating a case in which a mouse is passed over a specific second point and information on a corresponding object is displayed.
Figure 6:
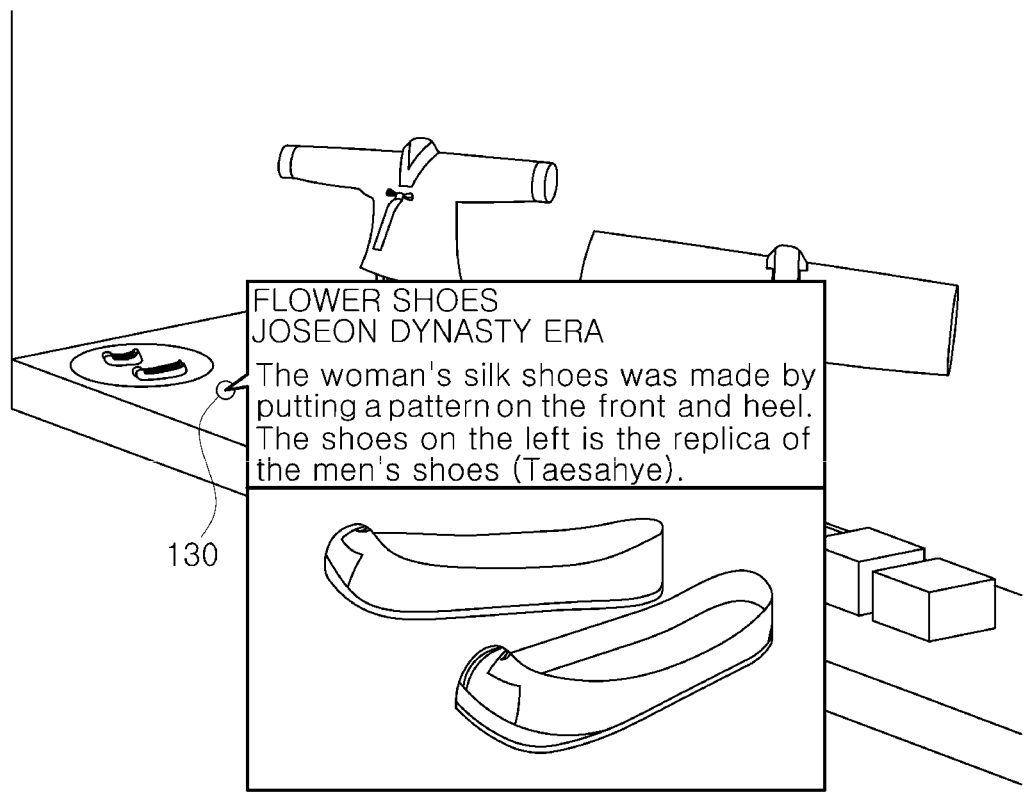
FIG. 6 is an exemplary diagram illustrating a case in which a user moves to the front of a corresponding object by selecting a second point over which a mouse is passed in FIG. 5.
Figure 7:
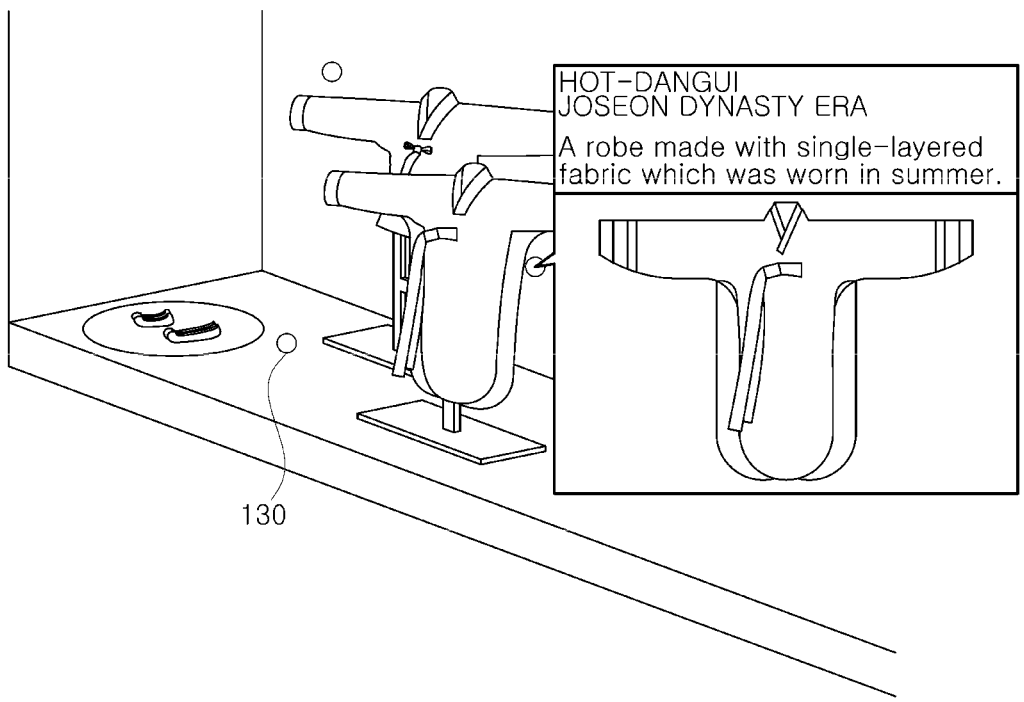
FIG. 7 is an exemplary diagram illustrating a case in which a mouse is passed over a second point of another object.
Figure 8:
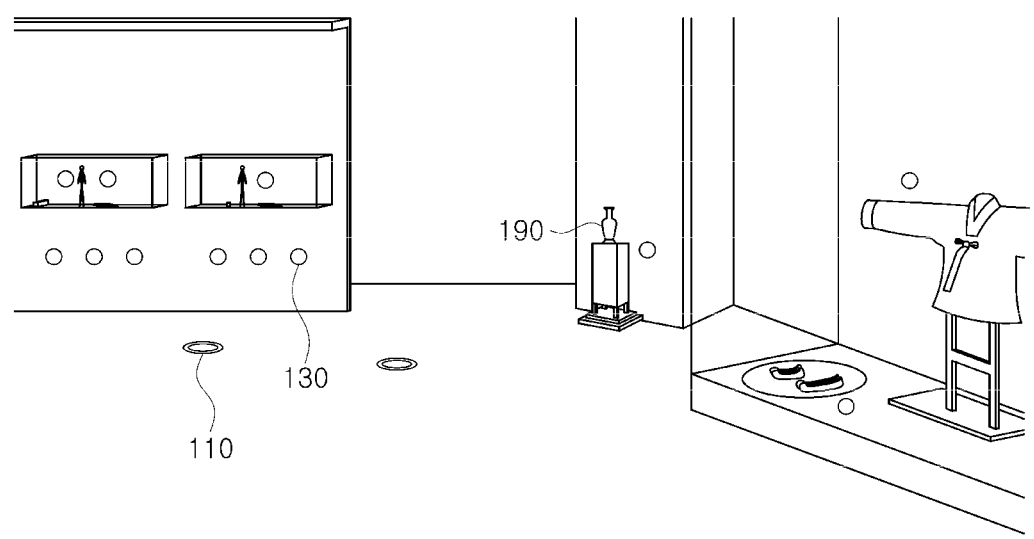
FIG. 8 is an exemplary diagram illustrating a screen viewed at another angle at the position of FIG. 6.

FIG. 5 is an exemplary diagram illustrating a case in which a mouse is passed over a specific second point and information on a corresponding object is displayed, FIG. 6 is an exemplary diagram illustrating a case in which a user selects a second point over which a mouse has been passed and moves to the front of a corresponding object, FIG. 7 is an exemplary diagram illustrating a case in which a mouse is passed over a second point of another object, and FIG. 8 is an exemplary diagram illustrating a screen viewed at another angle at the position of FIG. 6.

FIG. 5 illustrates a case in which a mouse is passed over a second point 130 corresponding to an object (flower shoes, 190) in FIG. 3 illustrating one floor of a museum and photograph and information of the flower shoes are displayed.

In addition, FIG. 6 illustrates a case in which a user selects a second point 130 corresponding to an object (flower shoes, 190) and moves to a position of a first point 110 corresponding to the object (flower shoes, 190).

FIG. 7 illustrates a case in which a mouse is passed over the second point 130 corresponding to the object (hot-dangui, 190) in FIG. 6, and photograph and information of the hot-dangui are displayed.

In addition, the user may change a point of view by rotating a screen and look around his/her surroundings in 360 degrees as illustrated in FIG. 8, and move to a corresponding position by selecting another first point 110 or another second point 130 and appreciates other objects 190.

Therefore, the collecting device 230 may collect the traffic lines of the user in the VR image and the history of objects 190 which the user has appreciated by using click history or selection history of the user associated with the first points 110 and the second points 130. The hit map generating device 250 may generate a hit map in the VR image by using the traffic lines, visited positions, history of appreciated objects 190 of all users who have appreciated the VR image, through information collected by the collecting device 230, thereby analyzing the degree of interest of users in the VR image.

The steps of a method or algorithm described in connection with the embodiments disclosed herein may be embodied directly in hardware, in a software module executed by hardware or in a combination of the two. A software module may reside in Random Access Memory (RAM), Read Only Memory (ROM), Erasable Programmable ROM (EPROM), Electrically Erasable Programmable ROM (EEPROM), flash memory, hard disk, a removable disk, a CD-ROM, or any other form of computer-readable storage medium known in the art.

Although the embodiments of the inventive concept have been described with reference to the accompanying drawings, those skilled in the art will appreciate that various modifications, additions and substitutions are possible, without departing from the scope and spirit of the inventive concept as disclosed in the accompanying claims. Therefore, it is should be understood by those skilled in the art that the embodiments are illustrative and not restrictive.

According to the inventive concept as described above, a user can freely move in a VR image, appreciate objects, and check information on the objects to allow the user to feel as if the user were actually making a visit, and it is possible to analyze the degree of interest of users by performing analysis and generating a hit map.

Also, the user can autonomously move along a travel route in the VR image and appreciate objects by selecting an autonomous play mode. Furthermore, the user can stop before an object which the user is interested in, thereby figuring out which objects the user is interested in.

Effects of the inventive concept may not be limited to the above-described effects. Although not described herein, other effects by the inventive concept can be clearly understood by those skilled in the art from the following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A system for analyzing a degree of interest of a user who watches a Virtual Reality (VR) image transmitted to a user terminal or a VR device from a server, the system comprising:
 a collecting device configured to collect a traffic line of the user in the VR image by using selection history of a first point; and
 a hit map generating device configured to analyze traffic lines of all users who have watched the VR image through information collected by the collecting device and generate a hit map in the VR image according to frequencies with which the users have visited each position in the VR image,
 wherein the first point is displayed on a travel route in the VR image and allows the user to be moved to a corresponding position in the VR image when being selected by the user.

2. The system of claim 1, wherein the collecting device counts numbers of visits to first points selected by the user by using selection history of the first points, and
 wherein the hit map generating device generates a hit map in the VR image by summing the numbers of visits to the first points selected by all users who have watched the VR image.

3. The system of claim 2, wherein, when the user moves back to a previous position by selecting a first point, the collecting device further counts a number of visits to the corresponding first point.

4. The system of claim 1, wherein the collecting device counts a number of visits to each object in the VR image by using selection history of second points, wherein the hit map generating device generates a hit map in the VR image by summing numbers of visits to objects by all users who have watched the VR image, and wherein the second points are respectively displayed along with the objects in the VR image, when a mouse is passed over the second point by the user, allows information on a corresponding object to be displayed, and when the second point is selected by the user, allows the user to be moved to a first point adjacent to the corresponding object in the VR image.

5. The system of claim 4, wherein the collecting device counts the number of visits to each object in the VR image using the selection history of the second point, and wherein the hit map generating device generates the hit map in the VR image by summing the numbers of visits to the objects of all users who have watched the VR image.

6. The system of claim 5, wherein the collecting device outputs a list of objects in the VR image to a user who has watched the VR image and receives a selection of an object which the user wants to again watch, from the user, and wherein the system further comprises an analyzing device configured to set, as an object of interest, an object which has selected by the user for re-watching a predetermined number of times or more.

7. The system of claim 1, further comprising an analyzing device configured to divide an area in the VR image into two or more zones and count a total number of visits to each of the zones and a total number of visits to each object in each of the zones and select an object which is most visited, among objects of each of the zones.

8. The system of claim 4, further comprising an analyzing device configured to allocate two or more neighboring objects in the VR image to a group, and set an object which is most visited as an object of interest, among objects of each group.

9. The system of claim 1, further comprising an input device configured to receive a gender and an age group of the user, wherein the hit map generating device generates a hit map associated with traffic lines and numbers of visits to objects in the VR image for each gender and for each age group.

10. The system of claim 1, wherein main visitors are set to the VR image with a specific gender and a specific age group according to purpose of each VR image, and wherein the hit map generating device generates, as a main visitor-hit map, a hit map associated with traffic lines and numbers of visits to objects of users with the specific gender and the specific age group, corresponding to the main visitors, from among all users who have watched the VR image.

11. The system of claim 1, wherein the hit map generating device indicates, as a saturation zone, a zone in which a number of times that traffic lines of different users cross each other exceeds a threshold value.

12. The system of claim 1, wherein the collecting device detects login of a user who watches the VR image; and wherein the hit map generating device separately generates a hit map for users who watch each VR image for the first time and a hit map for users who again watch each VR image.

13. A system for analyzing a degree of interest of a user who watches a VR image transmitted to a user terminal or a VR device from a server, comprising:

an autonomous play button configured to allow the user to appreciate objects in the VR image while moving from an entrance to an exit at a predetermined speed and along a predetermined route by passing through first points;

a collecting device configured to count a number of visits to a first point corresponding to a position at which a pause button is selected by the user during autonomous play of the VR image and count a number of visits to an object corresponding to a second point selected by the user during pause; and a hit map generating device configured to generate a hit map in the VR image according to the number of visits to each position and the number of visits to each object in the VR image through information collected by the collecting device, wherein the first points are indicated as a travel route in the VR image and when a mouse is passed over by the user, allows information on a corresponding object to be displayed, and when being selected, allows the user to be moved to a first point adjacent to a corresponding object in the VR image.

* * * * *